United States Patent
Danilov et al.

(10) Patent No.: US 10,929,385 B2
(45) Date of Patent: Feb. 23, 2021

(54) MULTI-LEVEL DATA DEDUPLICATION FOR ELASTIC CLOUD STORAGE DEVICES

(71) Applicant: EMC IP Holding Company LLC, Hopkinton, MA (US)

(72) Inventors: Mikhail Danilov, Saint Petersburg (RU); Konstantin Buinov, Prague (CZ)

(73) Assignee: EMC IP Holding Company LLC, Hopkinton, MA (US)

( * ) Notice: Subject to any disclaimer, the term of this patent is extended or adjusted under 35 U.S.C. 154(b) by 168 days.

(21) Appl. No.: 16/016,096

(22) Filed: Jun. 22, 2018

(65) Prior Publication Data

US 2019/0392062 A1     Dec. 26, 2019

(51) Int. Cl.
*G06F 16/215* (2019.01)
*G06F 16/23* (2019.01)

(52) U.S. Cl.
CPC ........ *G06F 16/2365* (2019.01); *G06F 16/215* (2019.01)

(58) Field of Classification Search
CPC .. G06F 3/0641; G06F 16/2365; G06F 16/215; G06F 16/24556; G06F 11/1453; G06F 16/289

See application file for complete search history.

(56) References Cited

U.S. PATENT DOCUMENTS

| | | | |
|---|---|---|---|
| 8,706,971 B1* | 4/2014 | Nayak | G06F 11/1453 711/133 |
| 2009/0271402 A1* | 10/2009 | Srinivasan | G06F 16/174 |
| 2016/0352511 A1* | 12/2016 | Bashyam | G06F 11/1004 |
| 2017/0031994 A1* | 2/2017 | Patterson, III | G06F 3/0683 |
| 2017/0060924 A1* | 3/2017 | Fitzhardinge | G06F 16/2246 |
| 2018/0025046 A1* | 1/2018 | Singhai | G06F 11/3409 707/692 |

* cited by examiner

*Primary Examiner* — Cheyne D Ly
(74) *Attorney, Agent, or Firm* — Amin, Turocy & Watson, LLP

(57) ABSTRACT

Facilitating multi-level data deduplication in an elastic cloud storage environment is provided herein. A system can comprise a processor and a memory that stores executable instructions that, when executed by the processor, facilitate performance of operations. The operations can comprise performing a first deduplication on a group of data objects at a data block level of a storage device. The operations can also comprise performing a second deduplication of the group of data objects at an object level of the storage device.

20 Claims, 11 Drawing Sheets

MULTI-LEVEL DATA DEDUPLICATION FOR ELASTIC CLOUD STORAGE DEVICES

TECHNICAL FIELD

The subject disclosure relates generally to data storage. More specifically, this disclosure relates to data deduplication for elastic cloud storage devices.

BACKGROUND

Distributed storage systems and/or object storage systems can provide a wide range of storage services while achieving high scalability, availability, and serviceability. An example of such storage systems is referred to as Elastic Cloud Storage (ECS), which uses the latest trends in software architecture and development to achieve the above noted services, as well as other services.

Data deduplication is a process that can eliminate redundant copies of a data portion and can reduce storage overhead. However, distributed storage systems and/or object storage systems do not provide proper support for data deduplication.

The above-described context with respect to conventional storage systems is merely intended to provide an overview of current technology, and is not intended to be exhaustive. Other contextual description, and corresponding benefits of some of the various non-limiting embodiments described herein, can become further apparent upon review of the following detailed description.

SUMMARY

The following presents a simplified summary of the disclosed subject matter to provide a basic understanding of some aspects of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

One or more embodiments relate to a method that can comprise facilitating, by a system comprising a processor, a first deduplication of a set of data objects at a data block level of a storage device. The method can also comprise facilitating, by the system, a second deduplication of the set of data objects at an object level of the storage device. The storage device can be a storage device of an elastic cloud storage system.

In an example, the set of data objects can comprise a first data object, a second data object, and a third data object. Further to this example, facilitating the first deduplication can comprise facilitating a comparison of a first data block sequence of the first data object, a second data block sequence of the second data object, and a third data block sequence of the third data object. In addition, the method can comprise facilitating a deduplication that replaces the second data block sequence of the second data object with a reference to the first data block sequence of the first data object based on a result of the comparison indicating the first data block sequence and the second data block sequence are identical data block sequences. Further, the method can comprise facilitating the second deduplication on the first data block sequence of the first data object and the third data block sequence of the third data object based on a result of the first comparison indicating the first data block sequence and the third data block sequence are different data block sequences.

Further to the above example, facilitating the second deduplication can comprise combining a first fingerprint for the first data block sequence of the first data object and a second fingerprint for the third data block sequence of the third data object, resulting in a combined fingerprint. In addition, the method can comprise facilitating a block-by-block comparison between the combined fingerprint and a set of known fingerprints associated with stored data blocks.

Continuing the above example, the method can comprise performing deduplication on first blocks of the first data object and second blocks of the third data object. The deduplication can be based on a first determination that the first blocks and the second blocks match a stored data block of the stored data blocks. In addition, the method can comprise storing third blocks of the first data object and fourth blocks of the second data object based on a second determination that the third blocks and the fourth blocks do not match the stored data blocks.

According to an implementation, facilitating the second deduplication can comprise obtaining, by the system, an object fingerprint based on a combination of a first fingerprint of a first sequence of first data blocks and a second fingerprint of a second sequence of second data blocks. Further to this implementation, the method can comprise matching, by the system, the object fingerprint to a set of known object fingerprints associated with stored existing objects.

Further to the above implementation, the method can comprise determining, by the system, the object fingerprint matches a known object fingerprint in the set of known object fingerprints. The method can also comprise facilitating, by the system, a block-by-block reference comparison between the object fingerprint and the known object fingerprint.

Another embodiment provided herein is a system that can comprise a processor and a memory that stores executable instructions that, when executed by the processor, facilitate performance of operations. The operations can comprise performing a first deduplication on a group of data objects at a data block level of a storage device. The operations can also comprise performing a second deduplication of the group of data objects at an object level of the storage device. The storage device can be a storage device of an elastic cloud storage system.

In an example, the group of data objects can comprise a first data object, a second data object, and a third data object. The operations can comprise comparing a first data block sequence of the first data object, a second data block sequence of the second data object, and a third data block sequence of the third data object. The operations can also comprise replacing the second data block sequence of the second data object with a reference to the first data block sequence of the first data object based on the first data block sequence and the second data block sequence being determined to be identical data block sequences.

In another example, the group of data objects can comprise a first data object, a second data object, and a third data object, and the operations can comprise comparing a first data block sequence of the first data object, a second data block sequence of the second data object, and a third data block sequence of the third data object. The operations can also comprise performing the second deduplication on the first data block sequence of the first data object and the third data block sequence of the third data object based on a result of the comparing indicating the first data block sequence and the third data block sequence are different data block sequences.

Further to the above example, the operations can comprise combining a first hash value for the first data block sequence of the first data object and a second hash value for the third data block sequence of the third data object. The operations can also comprise comparing a first group of blocks of the first data object against a second group of blocks of the third data object.

Continuing the above example, the operations can comprise replacing second blocks of the second group of blocks with a reference to first blocks of the first group of blocks based on the second blocks being determined to match the first blocks. Further, the operations can comprise storing third blocks of the second group of blocks and fourth blocks of the first group of blocks based on the third blocks and the fourth blocks being determined to be non-matching blocks.

According to an implementation, the operations can comprise, prior to performing the first deduplication, determining respective hash values for data objects in the group of data objects.

In accordance with some implementations, the group of data objects can comprise a first data object stored in a storage device and a second data object scheduled to be added to the storage device. According to these implementations, the operations can comprise comparing a first hash value of the first data object against a second hash value of the second data object. Further, the operations can comprise replacing the second data object with a reference to the first data object based on a first determination that the first hash value and the second hash value are identical hash values. Alternatively, the operations can comprise storing the second data object in the storage device based on a second determination that the first hash value and the second hash value are non-identical hash values.

According to another implementation, performing the first deduplication can comprise facilitating a single fingerprint calculation for the group of data objects. Further, performing the second deduplication can comprise facilitating a single byte-by-byte comparison between data objects in the group of data objects that have been determined not to match during the single fingerprint calculation.

According to another embodiment, provided herein is a computer-readable storage medium comprising instructions that, in response to execution, cause a system comprising a processor to perform operations. The operations can comprise facilitating a first deduplication of data objects at a data block level of a storage device comprising performing a single fingerprint calculation for the data objects. The operations can also comprise facilitating a second deduplication of the data objects at an object level of the storage device comprising performing a single byte-by-byte comparison of at least two data objects of the data objects that have been determined not to match during the single fingerprint calculation.

According to an implementation, the operations can also comprise comparing respective data block sequences of the data objects. Further to this implementation, the operations can comprise performing deduplication that replaces a first data object of the data objects with a reference to a second data object of the data objects based on the first data object and the second data object being determined to be duplicate data objects.

According to another implementation, the operations can comprise combining a first fingerprint calculated for a first data object of the data objects and a second fingerprint calculated for a second data object of the data objects to obtain a combined fingerprint. The operations can also comprise comparing the combined fingerprint with known fingerprints. Further, the operations can comprise replacing the combined fingerprint with a reference to a known fingerprint of the known fingerprints based on the combined fingerprint being determined to be a duplicate of the known fingerprint.

To the accomplishment of the foregoing and related ends, the disclosed subject matter comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the drawings. It will also be appreciated that the detailed description can include additional or alternative embodiments beyond those described in this summary.

BRIEF DESCRIPTION OF THE DRAWINGS

Various non-limiting embodiments are further described with reference to the accompanying drawings in which.

DETAILED DESCRIPTION

Figure 1:
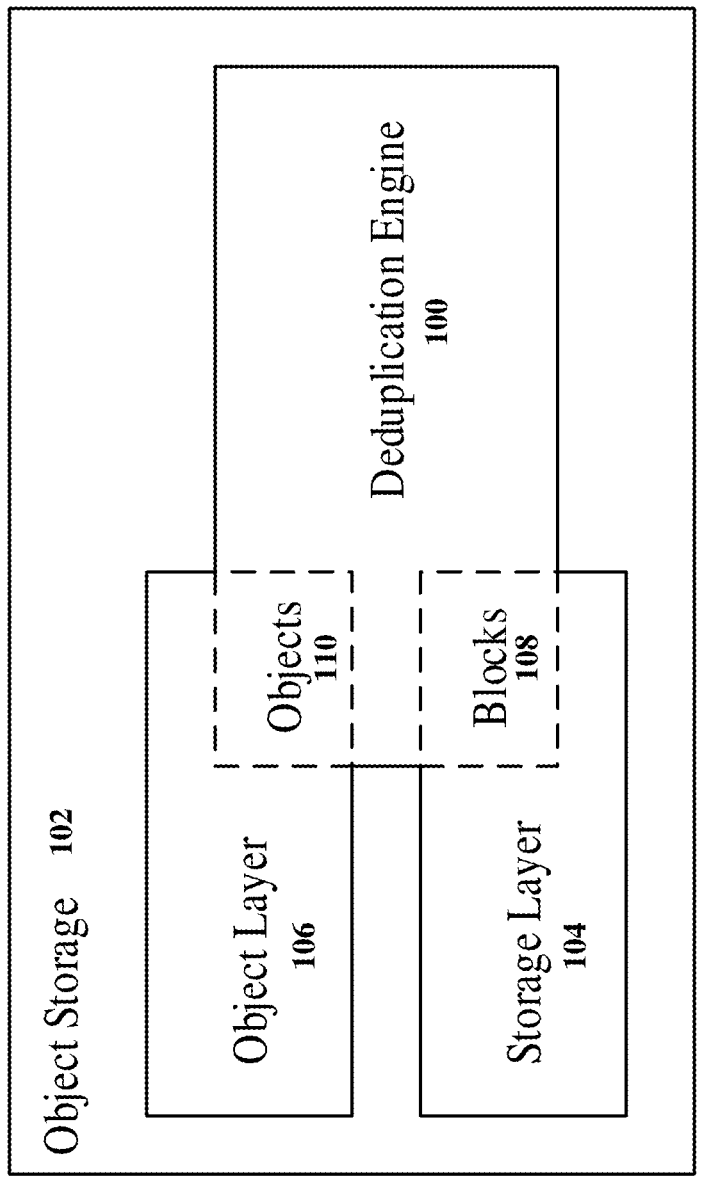
FIG. 1 illustrates a representation of a data deduplication engine component in accordance with one or more embodiments described herein.

One or more embodiments are now described more fully hereinafter with reference to the accompanying drawings in which example embodiments are shown. In the following description, for purposes of explanation, numerous specific details are set forth in order to provide a thorough understanding of the various embodiments. However, the various embodiments can be practiced without these specific details. In other instances, well-known structures and devices are shown in block diagram form in order to facilitate describing the various embodiments.

Elastic Cloud Storage (ECS) uses cutting-edge technology to implement many of its functions. There are certain gaps, however. Data deduplication is an essential feature for high-end storage systems. Customers rely on deduplication and suffer because ECS does not have proper support for data deduplication.

Data deduplication is a process that eliminates redundant copies of a data portion to reduce storage overhead. With deduplication, a storage system keeps just one physical copy of a data portion. All blocks, files, objects, and so on, that contain the data portion simply reference this one shared copy.

There are different approaches for data deduplication. Regardless of the approach being used, a deduplication engine can implement similar logic. For example, the engine can calculate a fingerprint (e.g. a hash value, such as MD5 algorithm) for a data portion and compare the fingerprint to fingerprints of existing (e.g., stored) data portions. If there is a data portion with the same fingerprint, the engine can perform a byte-by-byte comparison for the data portions. If the engine detects identical data, the engine can perform deduplication.

Deduplication can work at different levels. Deduplication can be utilized for object storages to have deduplication (also referred to as single-instancing) at the object level. However, sometimes even object storages perform low-level deduplication at the block level. There are advantages and disadvantage for implementing deduplication at a particular level. For example, deduplication at the block level means higher match probability and, therefore, higher capacity use efficiency for user data. On the other hand, capacity overheads on deduplication are higher when it works at a low level. For example, after deduplication of two identical objects of 1 M blocks size, the system can produce 1M block references. In another example, deduplication at the object level means lesser capacity use efficiency for user data but also lesser capacity overheads on deduplication itself. For example, after deduplication of two identical objects of 1M blocks size, the system can produce just 1 object reference.

Accordingly, a challenge when designing a deduplication feature is that it needs to be chosen what to gain: high capacity use efficiency for user data or low system capacity overheads on deduplication. This can be a difficult choice. To overcome the above challenge, as well as other challenges, the various aspects provided herein combine deduplication at different levels to obtain both high capacity use efficiency for user data and low system capacity overheads on deduplication.

FIG. 1 illustrates a representation of a data deduplication engine component in accordance with one or more embodiments described herein. Repetitive description of like elements employed in other embodiments described herein is omitted for sake of brevity.

A straightforward way to organize two-level deduplication is to introduce two deduplication engines. One deduplication engine would work at the block level. The other deduplication engine would work at the object level. This approach is simple but resource inefficient. Indeed, the same data would need to pass fingerprint calculations and, potentially, byte-by-byte comparison two times: once at the block level and once at the object level. This makes the straightforward method up to two times more CPU and I/O intensive.

In order to achieve higher resource efficiency, as discussed herein, an integrated two-level deduplication engine 100 is provided. The following provides a simple model of an object storage system 102 (e.g., ECS). Object storage normally consists of two layers, namely, a storage layer 104 and an object layer 106. The storage layer 104 is a low layer that assures data storage and protection. The storage layer 104 is not aware of objects and works with low-level data portions, such as data blocks 108. The object layer 106 is a high layer that provides object interface to data and associated value-added functions. The object layer 106 can work with data objects 110.

The two-level deduplication engine 100 can be a two-level deduplication engine or a cross-layer component that deduplicates the data blocks 108 at the storage layer 104 and deduplicates the data objects 110 at the object layer 106. The following explains how the different layers can coordinate their work to provide two-level data deduplication without doubling resource consumption. It is noted that although the various aspects are described with respect to a deduplication approach, the various aspects can be applied to other deduplication approaches as well.

The object layer 106 drives the process of new data creation within the system. A new data object can be created and stored using the storage layer 104 as a sequence of data blocks 108. When the object layer 106 uses the storage layer 104 to store another block of data (e.g., data blocks 108), the integrated two-level deduplication engine 100, at the storage layer 104, can calculate respective hash values (fingerprints) for the data blocks 108 and compares the hash values (fingerprints) to fingerprints of existing/known blocks.

If there is already a block with the same fingerprint, the two-level deduplication engine 100 can perform a byte-by-byte comparison for the data blocks 108 and, if there is an exact match, can perform deduplication. The new block is not stored. The reference to the existing block is reported to the object layer 106 together with its fingerprint.

The two-level deduplication engine 100 at the object layer 106 can combine (e.g. simply XORs) the fingerprints of the blocks to obtain the object's fingerprint. The two-level deduplication engine 100 can compare the object's fingerprint to fingerprints of existing/known objects. If there is already an object with the same fingerprint, the two-level deduplication engine 100 does not perform a byte-by-byte comparison for the objects. The two-level deduplication engine 100 can perform a block reference by block reference comparison and, in case of an exact match, can perform deduplication. The new object, which is a collection of block references, is not stored. The reference to the existing object is stored instead.

In summary, the two-level deduplication engine 100 works, and benefits, at the block level and the object level while CPU intensive fingerprint calculation is performed for the same data only once. Further, I/O intensive byte-by-byte comparison is performed for the same data only once.

The two-level deduplication engine 100 can also operate at three (and possibly more) levels. For example, in ECS the deduplication engine can work at the block level, a segment level, and the object level. The segment level is a level where a large enough object is stored in ECS as a sequence of approximately 2 MB segments;

The following example illustrates the benefits from using a two-level deduplication approach as discussed herein.

Namely, deduplication at the block level assures high capacity use efficiency for user data while deduplication at the object level assures reduction of system capacity overheads on deduplication.

Figure 2:
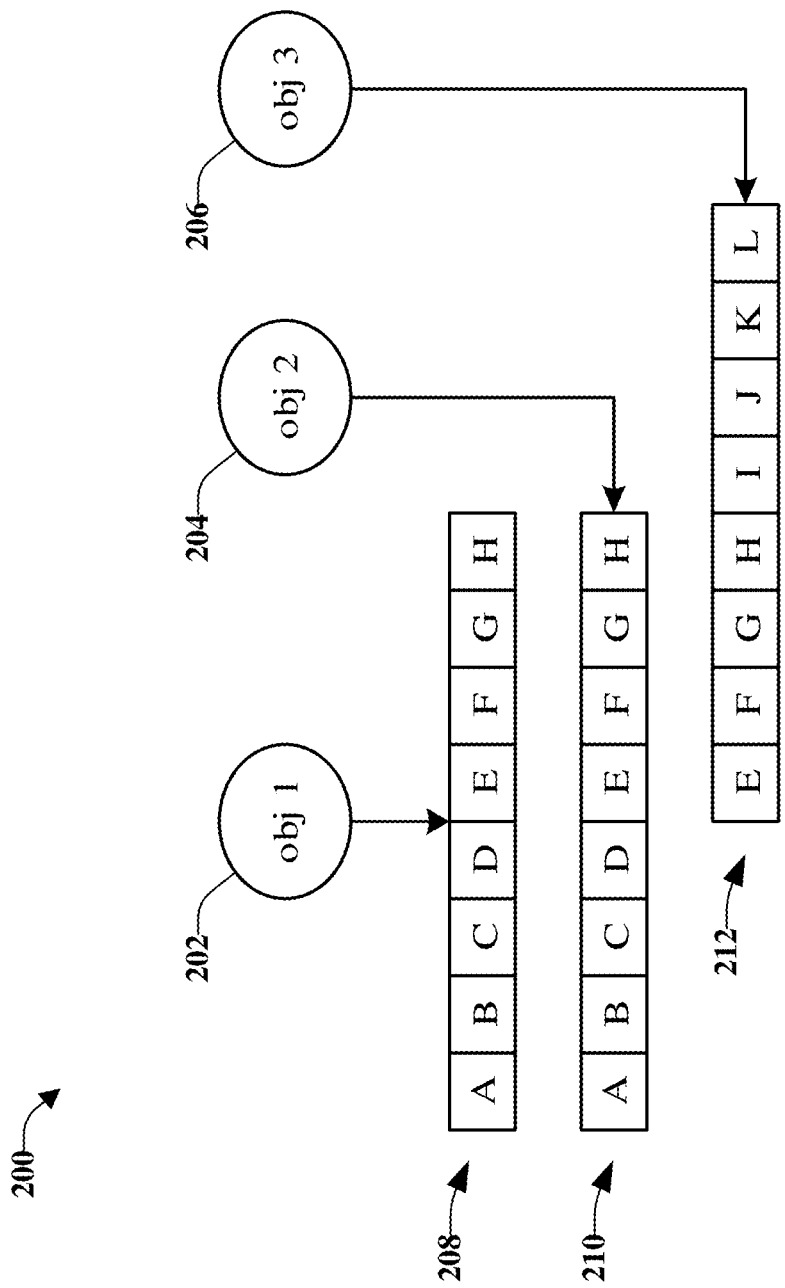
FIG. 2 illustrates an example schematic representation of three objects without deduplication in accordance with one or more embodiments described herein.

FIG. 2 illustrates an example schematic representation 200 of three objects without deduplication in accordance with one or more embodiments described herein. Repetitive description of like elements employed in other embodiments described herein is omitted for sake of brevity.

Illustrated are three data objects, namely, a first data object 202 (e.g., obj 1), a second data object 204 (e.g., obj 2), and a third data object 206 (e.g., obj 3). For this example, the objects contain eight data blocks. For example, the first data object 202 comprises a first set of data blocks 208, which are labeled A, B, C, D, E, F, G, and H. The second data object 204 comprises a second set of data blocks 210, which are labeled A, B, C, D, E, F, G, and H. Further, the third data object 206 comprises a third set of data blocks 212, which are labeled E, F, G, H, I, J, K, and L.

Thus, the first set of data blocks 208 and the second set of data blocks 210 are identical. Further, blocks E to H are identical for all three objects (e.g., the first data object 202, the second data object 204, and the third data object 206). Accordingly, there are twenty-four blocks of data (e.g., three sets of data blocks that comprise eight data blocks each). However, only twelve blocks of data (e.g., blocks labeled A through L) are unique (e.g., not duplicated across data objects).

Figure 3:
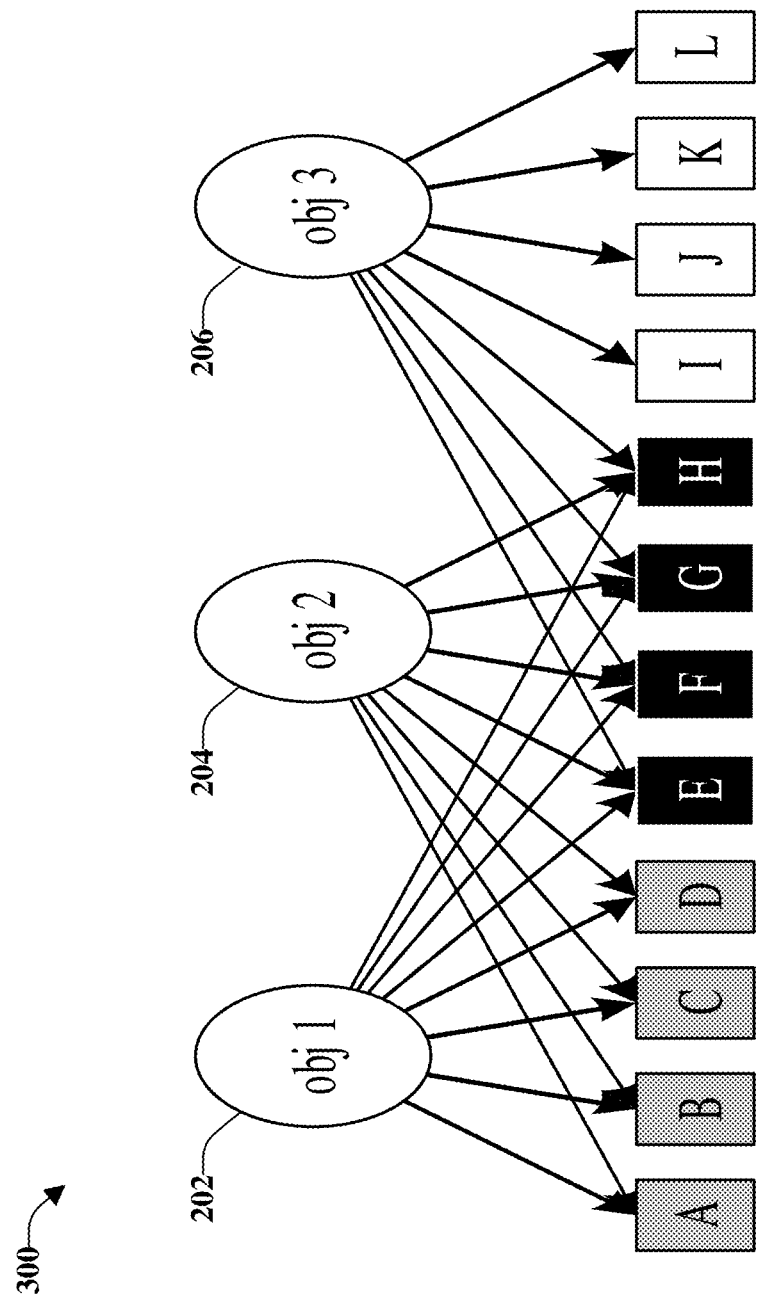
FIG. 3 illustrates a schematic representation of a result of data deduplication at the block level for the data objects of FIG. 2 without multi-level deduplication in accordance with one or more embodiments described herein.

FIG. 3 illustrates a schematic representation 300 of a result of data deduplication at the block level for the data objects of FIG. 2 without multi-level deduplication in accordance with one or more embodiments described herein. Repetitive description of like elements employed in other embodiments described herein is omitted for sake of brevity.

Data deduplication at the block level can assure high capacity use efficiency for user data. For the example of FIG. 2, only twelve unique blocks (e.g., blocks labeled A through L) are stored instead of all twenty-four blocks. As illustrated, data blocks A through D are referenced twice: a first time by the first data object 202 and a second time by the second data object 204. The data blocks E through H are reference three times: a first time by the first data object 202, a second time by the second data object 204, and a third time by the third data object 206. Further, the data blocks I through L are referenced once by the third data object.

However, FIG. 3 is cumbersome (and looks a bit messy) because of the twenty-four blocks referenced in the figure. In implementation, more than three data objects and more than twenty-four data blocks can be utilized in a system. Therefore, the complexity can be greatly increased for real-life objects and hundreds or even thousands of block references. Accordingly, the system capacity overhead on deduplication are significant.

Figure 4:
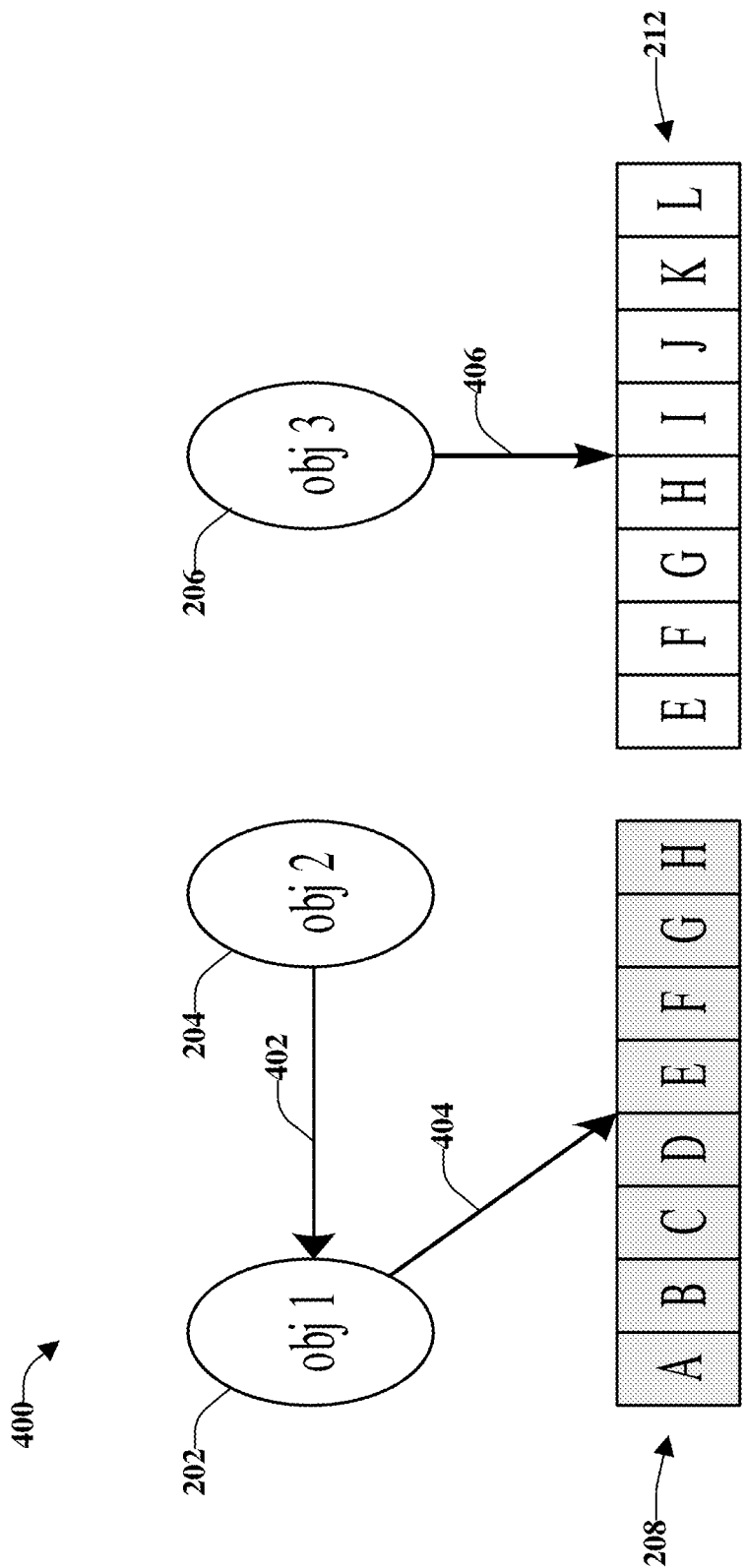
FIG. 4 illustrates a schematic representation of a result of data deduplication made at the object level for the data objects of FIG. 2 without multi-level deduplication in accordance with one or more embodiments described herein.

FIG. 4 illustrates a schematic representation 400 of a result of data deduplication made at the object level for the data objects of FIG. 2 without multi-level deduplication in accordance with one or more embodiments described herein. Repetitive description of like elements employed in other embodiments described herein is omitted for sake of brevity.

As indicated, the second data object 204 can reference, at 402, the first data object 202, which references, at 404, a set of data blocks. The set of data blocks comprises the first set of data blocks 208, which is identical to the second set of data blocks 210. The third data object 206 references, at 406, the third set of data blocks 212. FIG. 4 contains a minimal number of references and, therefore, is not as complex as FIG. 3. However, the result is not fully optimized for simplification because there are sixteen blocks stored for the set of twelve unique blocks. The data blocks A through H are referenced twice: a first time by the first data object 202 and a second time by the third data object 206. Further, the blocks I through L are referenced once by the third data object 206.

Figure 5:
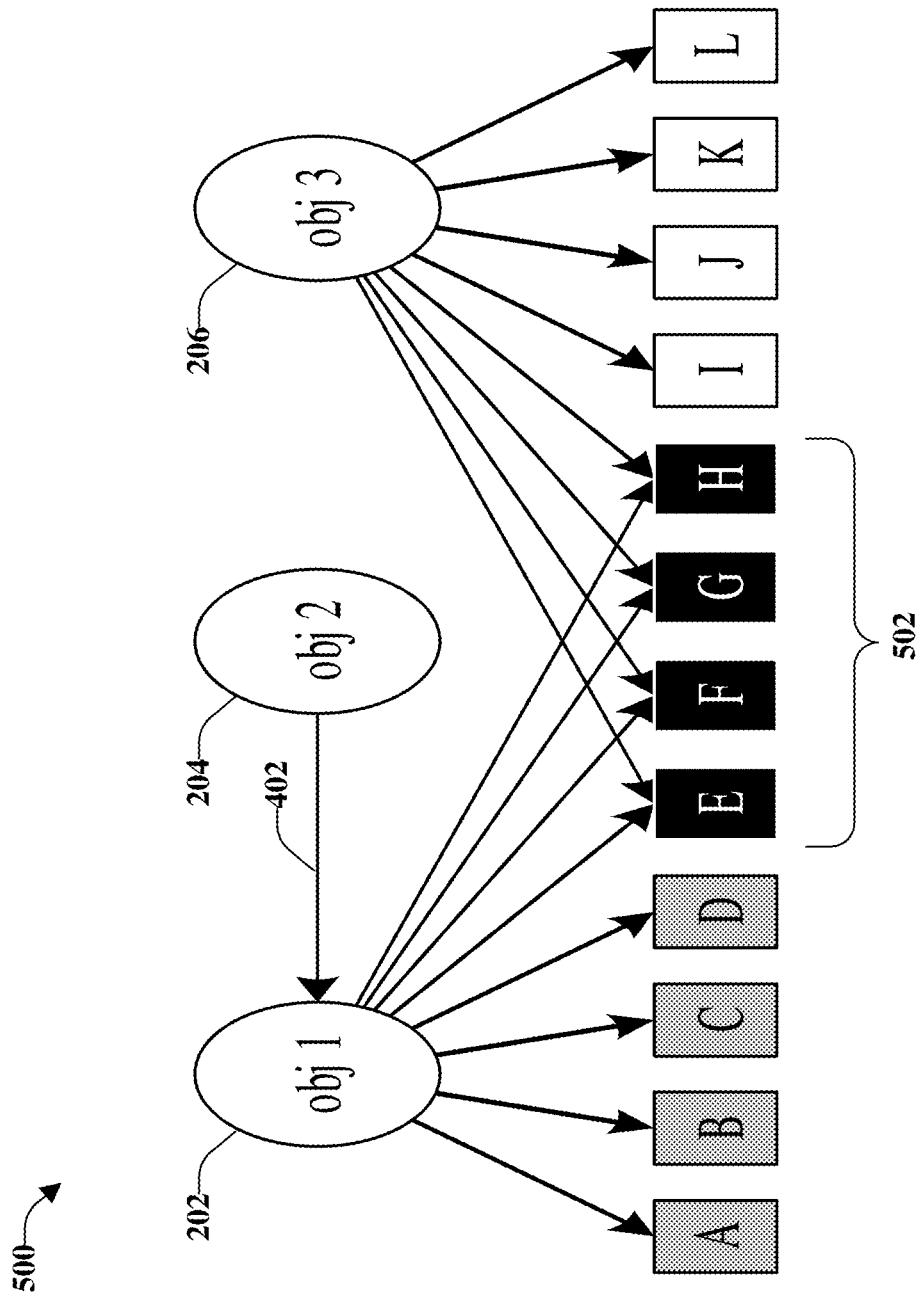
FIG. 5 illustrates a schematic representation of a result of deduplication made at block and object levels in accordance with one or more embodiments described herein.

FIG. 5 illustrates a schematic representation 500 of a result of deduplication made at block and object levels in accordance with one or more embodiments described herein. Repetitive description of like elements employed in other embodiments described herein is omitted for sake of brevity.

Since the first data object 202 and the second data object 204 comprise identical sets of data blocks, the second data object 204 references the first data object 202, as indicated at 402. Thus, data blocks A through D are referenced a single time by the first data object 202. Further, since data blocks E through H are reference by both the first data object 202 (and by reference the second data object 204) and the third data object 206, there is a single reference to data blocks E through H, as indicated at 502. In addition, data blocks I through L are referenced a single time by the third data object 206.

Accordingly, data deduplication at the block level assures high capacity use efficiency for user data. In the example of FIG. 5, only twelve unique blocks are stored instead of twenty-four blocks (as indicated in FIG. 3). Subsequent deduplication at the object level can assure reduction of system overhead on storing references. For objects of several megabytes (MBs), the capacity saving on references can be around one-third of the overall number of references. It is noted that this significant result can be achieved with the disclosed aspects without significant increase of resource consumption.

Figure 6:
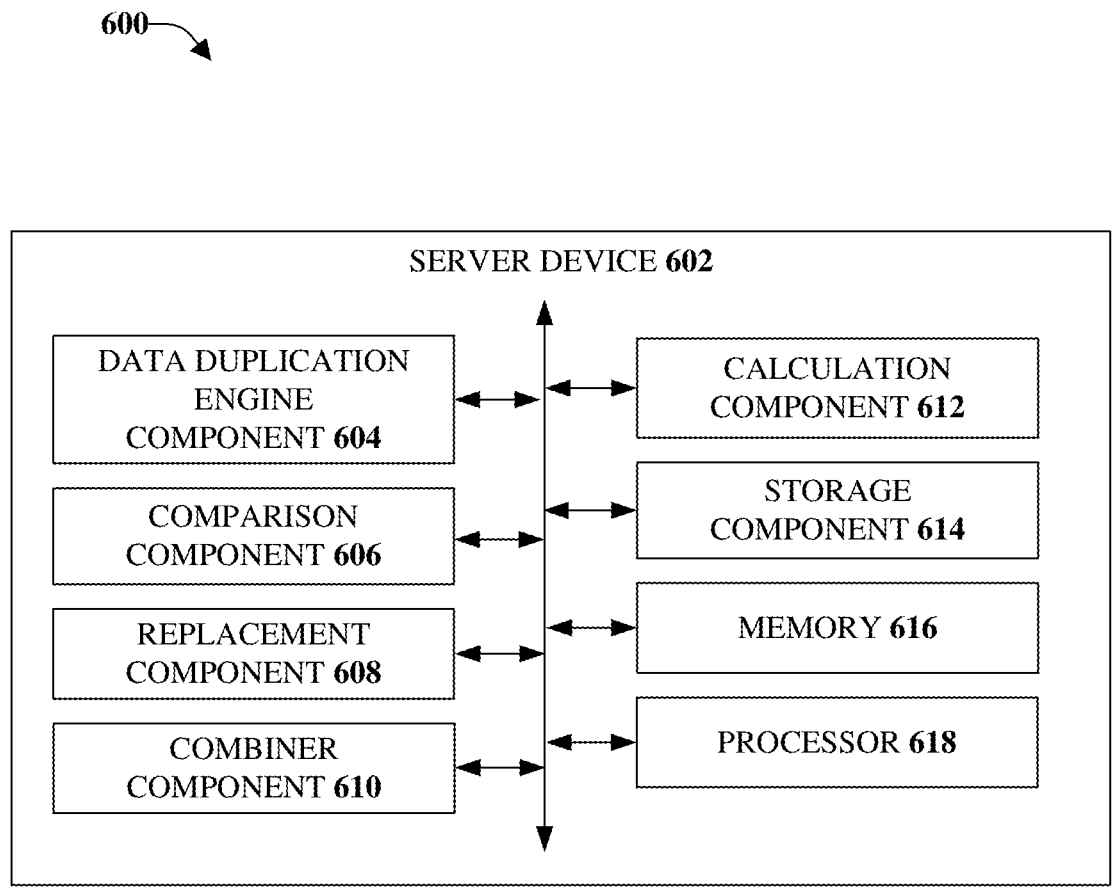
FIG. 6 illustrates an example, non-limiting, system for multi-level data deduplication in accordance with one or more embodiments described herein.

FIG. 6 illustrates an example, non-limiting, system 600 for multi-level data deduplication in accordance with one or more embodiments described herein. Repetitive description of like elements employed in other embodiments described herein is omitted for sake of brevity.

The system 600 (as well as other systems discussed herein) can be implemented as a storage system that supports multi-level data deduplication (e.g., an elastic cloud storage). Thus, the system 600 can facilitate the deduplication of data at different levels (e.g., block level, object level, and so on).

The system 600 can include a server device 602 that can perform data deduplication at multiple levels as discussed herein. The server device 602 can include a data deduplication engine component 604, a comparison component 606, a replacement component 608, a combiner component 610, a calculation component 612, a storage component 614, at least one memory 616, and at least one processor 618.

As used herein, the term "storage device," "first storage device," "storage system," and the like, can include, for example, private or public cloud computing systems for storing data as well as systems for storing data comprising virtual infrastructure and those not comprising virtual infrastructure. The term "I/O request" (or simply "I/O") can refer to a request to read and/or write data.

The term "cloud" as used herein can refer to a cluster of nodes (e.g., set of network servers), for example, within a distributed object storage system, that are communicatively and/or operatively coupled to one another, and that host a set of applications utilized for servicing user requests. In general, the cloud computing resources can communicate with user devices via most any wired and/or wireless communication network to provide access to services that are based in the cloud and not stored locally (e.g., on the user device).

A typical cloud-computing environment can include multiple layers, aggregated together, that interact with one another to provide resources for end-users.

Further, the term "storage device" can refer to any Non-Volatile Memory (NVM) device, including Hard Disk Drives (HDDs), flash devices (e.g., NAND flash devices), and next generation NVM devices, any of which can be accessed locally and/or remotely (e.g., via a storage attached network (SAN)). In some embodiments, the term "storage device" can also refer to a storage array comprising one or more storage devices. In various embodiments, the term "object" refers to an arbitrary-sized collection of user data that can be stored across one or more storage devices and accessed using I/O requests.

The data deduplication engine component 604 (e.g., the two-level deduplication engine 100) can perform deduplication at different levels (e.g. block level, object level, and so on) and, therefore, can provide two-level deduplication. There are certain benefits and drawbacks associated with performing deduplication at each level. When benefits of deduplication performed at two or more different levels are combined, there can also be a proportional increase of deduplication's resource demands. As discussed herein, the various aspects can combine deduplication at different levels without significant increase of resource intensity of deduplication.

In further detail, the data deduplication engine component 604 is a cross-layer component that can deduplicate blocks at the storage layer and can deduplicate objects at the object layer. For example, the data deduplication engine component 604 can perform a first deduplication of a set of data objects at a data block level of a storage device. The storage device can be one or various types of storage systems. For example, the storage device can be an unstructured storage system (e.g., file storage, object storage, stream storage). In an example, the storage device can be a storage device of an ECS system. In addition, the data deduplication engine component 604 can perform a second deduplication of the set of data objects at an object level of the storage device. The different layers can coordinate the operations to provide two-level data deduplication without doubling resource consumption.

In an example the set of data objects can comprise a first data object (e.g., the first data object 202), a second data object (e.g., the second data object 204), and a third data object (e.g., the third data object 206). Further to this example, the comparison component 606 can compare a first data block sequence of the first data object (e.g., the first set of data blocks 208), a second data block sequence of the second data object (e.g., the second set of data blocks 210), and a third data block sequence of the third data object (e.g., the third set of data blocks 212).

The replacement component 608 can replace the second data block sequence of the second data object with a reference to the first data block sequence of the first data object. The reference can be based on the first data block sequence and the second data block sequence being determined to be identical data block sequences. Further, the comparison component 606 can perform the second deduplication on the first data block sequence of the first data object and the third data block sequence of the third data object based on the comparison component 606 determining that the first data block sequence and the third data block sequence are different data block sequences.

According to some implementations, the combiner component 610 can combine a first hash value for the first data block sequence of the first data object and a second hash value for the third data block sequence of the third data object. In an example, prior to the data deduplication engine component 604 performing the first data deduplication, the calculation component 612 can determine respective hash values for data objects in the group of data objects. Further, the comparison component 606 can compare a first group of blocks of the first data object against a second group of blocks of the third data object.

In some implementations, the replacement component 608 can replace second blocks of the second group of blocks with a reference to first blocks of the first group of blocks based on the second blocks being determined to match the first blocks (e.g., the blocks E through H of FIG. 5). Further to these implementations, the storage component 614 can store third blocks of the third group of blocks (e.g., blocks I through L of FIG. 5) and fourth blocks of the first group of blocks (e.g., blocks A through D of FIG. 5) based on the third blocks and the fourth blocks being determined to be non-matching blocks.

In an example, the group of data objects can comprise a first data object stored in the storage device (e.g., the storage component 614) and a second data object scheduled to be added to the storage device. Further to this example, the comparison component 606 can compare a first hash value of the first data object against a second hash value of the second data object. Different actions can occur based on whether the first hash value are identical hash values or non-identical hash values. If the comparison component 606 determines the first hash value and the second hash value are identical hash values, the replacement component 608 can replace the second data object with a reference to the first data object. Alternatively, if the comparison component 606 determines the first hash value and the second hash value are non-identical hash values, the storage component 614 can store the second data object in the storage device.

In another example, for the data deduplication engine component 604 to perform the first deduplication, the calculation component 612 can facilitate a single fingerprint calculation for the group of data objects. Further, for the data deduplication engine component 604 to perform the second deduplication, the calculation component 612 can facilitate a single byte-by-byte comparison between data objects in the group of data objects that have been determined not to match during the single fingerprint calculation.

As mentioned, data deduplication is a process that eliminates redundant copies of a data portion to reduce storage overhead. With deduplication, a storage system keeps a single physical copy of a data portion. All blocks, files, objects, and so on that contain the data portion are changed to reference the single physical copy.

There are at least two techniques for data deduplication, namely, inline deduplication and post-process deduplication Inline deduplication performs deduplication of data before it is written to a primary storage device (e.g., a hard drive). Therefore, data deduplication works inline with data creation within a storage system. Post-process deduplication waits for data to land on a primary storage device before initiating the deduplication process. Therefore, the deduplication process can work in background mode. The deduplication as discussed herein can be either inline deduplication or post-process deduplication.

In some embodiments, a storage device can comprise various services including: an authentication service to authenticate requests, storage APIs to parse and interpret requests, a storage chunk management service to facilitate storage chunk allocation/reclamation for different storage system needs and monitor storage chunk health and usage, a storage server management service to manage available storage devices capacity and to track storage devices states, and a storage server service to interface with the storage devices.

Further, a storage cluster can include one or more storage devices. For example, a distributed storage system can include one or more clients in communication with a storage cluster via a network. The network can include various types of communication networks or combinations thereof including, but not limited to, networks using protocols such as Ethernet, Internet Small Computer System Interface (iSCSI), Fibre Channel (FC), and/or wireless protocols. The clients can include user applications, application servers, data management tools, and/or testing systems.

As utilized herein an "entity," "client," "user," and/or "application" can refer to any system or person that can send I/O requests to a storage system. For example, an entity, can be one or more computers, the Internet, one or more systems, one or more commercial enterprises, one or more computers, one or more computer programs, one or more machines, machinery, one or more actors, one or more users, one or more customers, one or more humans, and so forth, hereinafter referred to as an entity or entities depending on the context.

With continuing reference to the server device 602, the at least one memory 616 can be operatively coupled to the at least one processor 618. The at least one memory 616 can store protocols associated with facilitating inline and/or post-process data deduplication in a data storage environment as discussed herein. Further, the at least one memory 616 can facilitate actions to control communication between the server device 602 and the one or more storage devices, such that the system 600 can employ stored protocols and/or algorithms to achieve improved storage management through multi-level data deduplication as described herein.

It should be appreciated that data store components (e.g., memories) described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

The at least one processor 618 can facilitate processing data related to multi-level data deduplication as discussed herein. The at least one processor 618 can be a processor dedicated to analyzing and/or generating information received, a processor that controls one or more components of the system 600, and/or a processor that both analyzes and generates information received and controls one or more components of the system 600.

Methods that can be implemented in accordance with the disclosed subject matter, will be better appreciated with reference to the following flow charts. While, for purposes of simplicity of explanation, the methods are shown and described as a series of blocks, it is to be understood and appreciated that the disclosed aspects are not limited by the number or order of blocks, as some blocks can occur in different orders and/or at substantially the same time with other blocks from what is depicted and described herein. Moreover, not all illustrated blocks can be required to implement the disclosed methods. It is to be appreciated that the functionality associated with the blocks can be implemented by software, hardware, a combination thereof, or any other suitable means (e.g., device, system, process, component, and so forth). Additionally, it should be further appreciated that the disclosed methods are capable of being stored on an article of manufacture to facilitate transporting and transferring such methods to various devices. Those skilled in the art will understand and appreciate that the methods could alternatively be represented as a series of interrelated states or events, such as in a state diagram.

Figure 7:
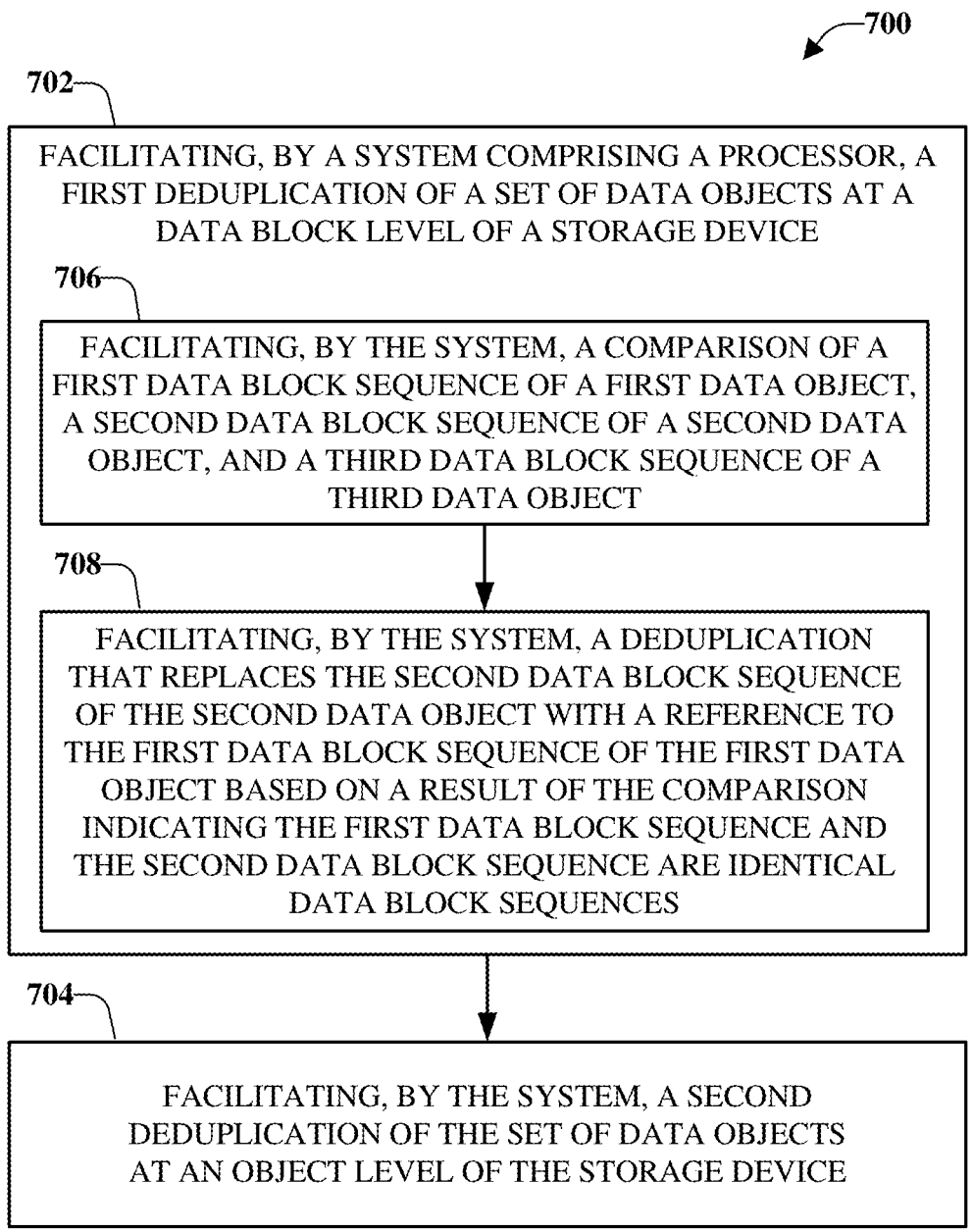
FIG. 7 illustrates a flow diagram of an example, non-limiting, computer-implemented method that facilitates multi-level data deduplication in accordance with one or more embodiments described herein.

FIG. 7 illustrates a flow diagram of an example, non-limiting, computer-implemented method 700 that facilitates multi-level data deduplication in accordance with one or more embodiments described herein. Repetitive description of like elements employed in other embodiments described herein is omitted for sake of brevity.

At 702, a system comprising a processor can facilitate a first deduplication of a set of data objects at a data block level of a storage device (e.g., via the data deduplication engine component 604). Further, at 704, the system can facilitate a second deduplication of the set of data objects at an object level of the storage device (e.g., via the data deduplication engine component 604).

According to an implementation, the set of data objects comprises a first data object (e.g., the first data object 202), a second data object (e.g., the second data object 204), and a third data object (e.g., the third data object 206). Further to this implementation, facilitating the first deduplication, can comprise, at 706 of the computer-implemented method 700, facilitating, by the system, a comparison of a first data block sequence of the first data object, a second data block sequence of the second data object, and a third data block sequence of the third data object (e.g., via the comparison component 606).

The computer-implemented method 700 can also comprise, at 708, facilitating, by the system, a deduplication that replaces the second data block sequence of the second data object with a reference to the first data block sequence of the first data object (e.g., via the replacement component 608). This can be based on a result of the comparison indicating the first data block sequence and the second data block sequence are identical data block sequences.

Figure 8:
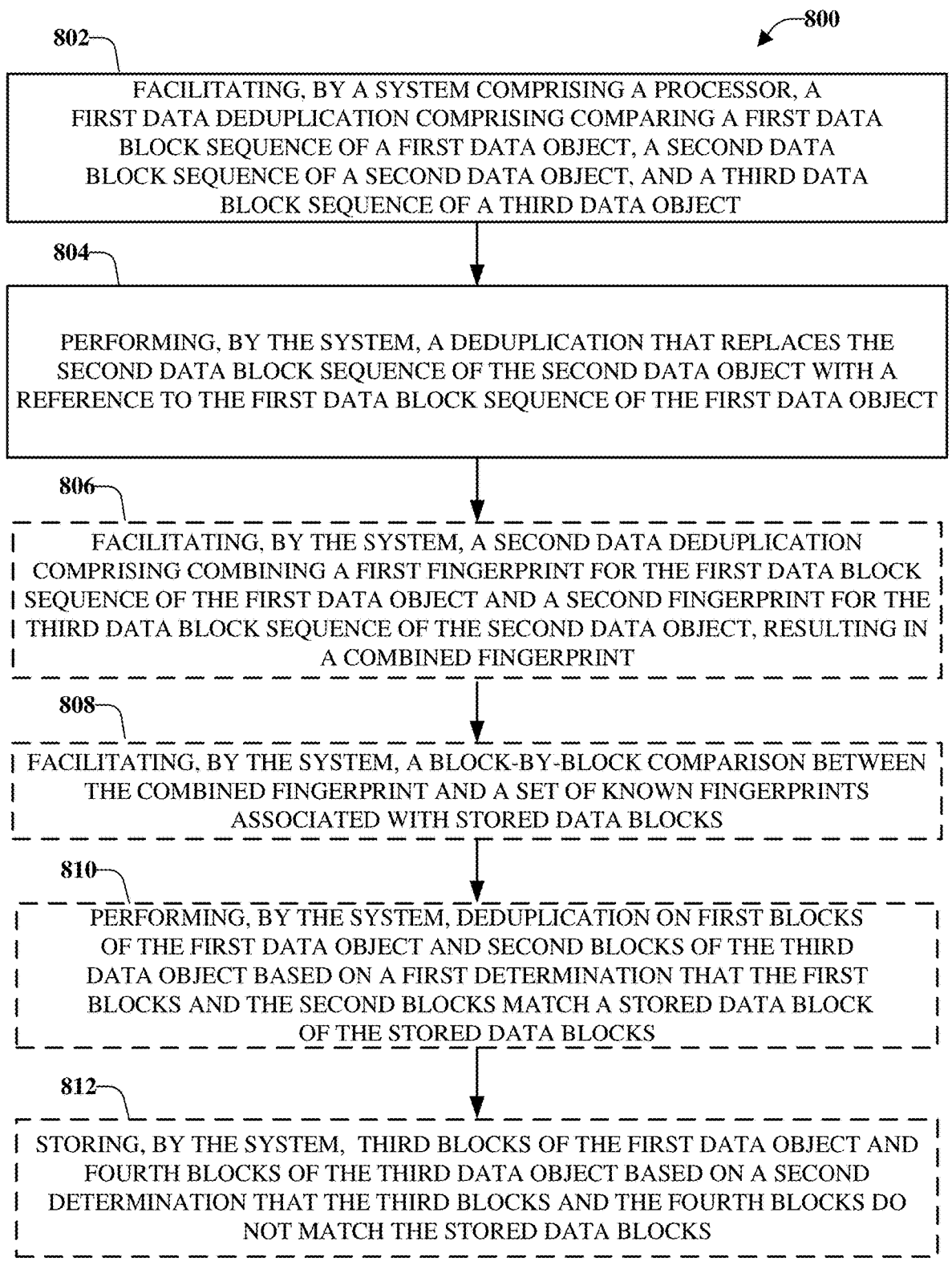
FIG. 8 illustrates a flow diagram of an example, non-limiting, computer-implemented method that facilitates performing a first data deduplication at a block level and a second data deduplication an object level in accordance with one or more embodiments described herein.

FIG. 8 illustrates a flow diagram of an example, non-limiting, computer-implemented method 800 that facilitates performing a first data deduplication at a block level and a second data deduplication an object level in accordance with one or more embodiments described herein. Repetitive description of like elements employed in other embodiments described herein is omitted for sake of brevity.

At 802 of the computer-implemented method 800, a system comprising a processor, can facilitate performance of a first data deduplication (e.g., via the data deduplication engine component 604). For example, facilitating the first data deduplication can comprise facilitating a comparison of a first data block sequence of a first data object, a second data block sequence of a second data object, and a third data block sequence of a third data object (e.g., via the comparison component 606). The first data deduplication can be performed at a data block level at a storage device.

Further, at 804 of the computer-implemented method 800, the system can facilitate a deduplication that replaces the second data block sequence of the second data object with a reference to the first data block sequence of the first data object (e.g., via the replacement component 608). Replacement of the second data block sequence with the reference based on a result of the comparison indicating the first data block sequence and the second data block sequence are identical data block sequences.

The computer-implemented method 800 can also comprise, at 806, facilitating, by the system, a second data deduplication (e.g., via the data deduplication engine component 604). The second data deduplication can comprise combining a first fingerprint for the first data block sequence of the first data object and a second fingerprint for the second data block sequence of the second data object, resulting in a combined fingerprint (e.g., via the combiner component 610). Further, at 808 of the computer-implemented method 800, the system can facilitate a block-by-block comparison between the combined fingerprint and a set of known fingerprints associated with stored data blocks (e.g., via the comparison component 606).

In an additional implementation, the computer-implemented method 800 can comprise performing, by the system, deduplication on first blocks of the first data object and second blocks of the third data object (e.g., via the data deduplication engine component 604). This can be based on a first determination that the first blocks and the second blocks match a stored data block of the stored data blocks, at 810 (e.g., blocks E through H of FIG. 5).

Further, at 812 of the computer-implemented method 800, the system can store third blocks of the first data object and fourth blocks of the third data object (e.g., via the storage component 614). The third blocks can be blocks A through D of FIG. 5 and the fourth blocks can be blocks I through L of FIG. 5. Storage of the third blocks and the fourth blocks can be based on a second determination that the third blocks and the fourth blocks do not match the stored data blocks.

Figure 9:
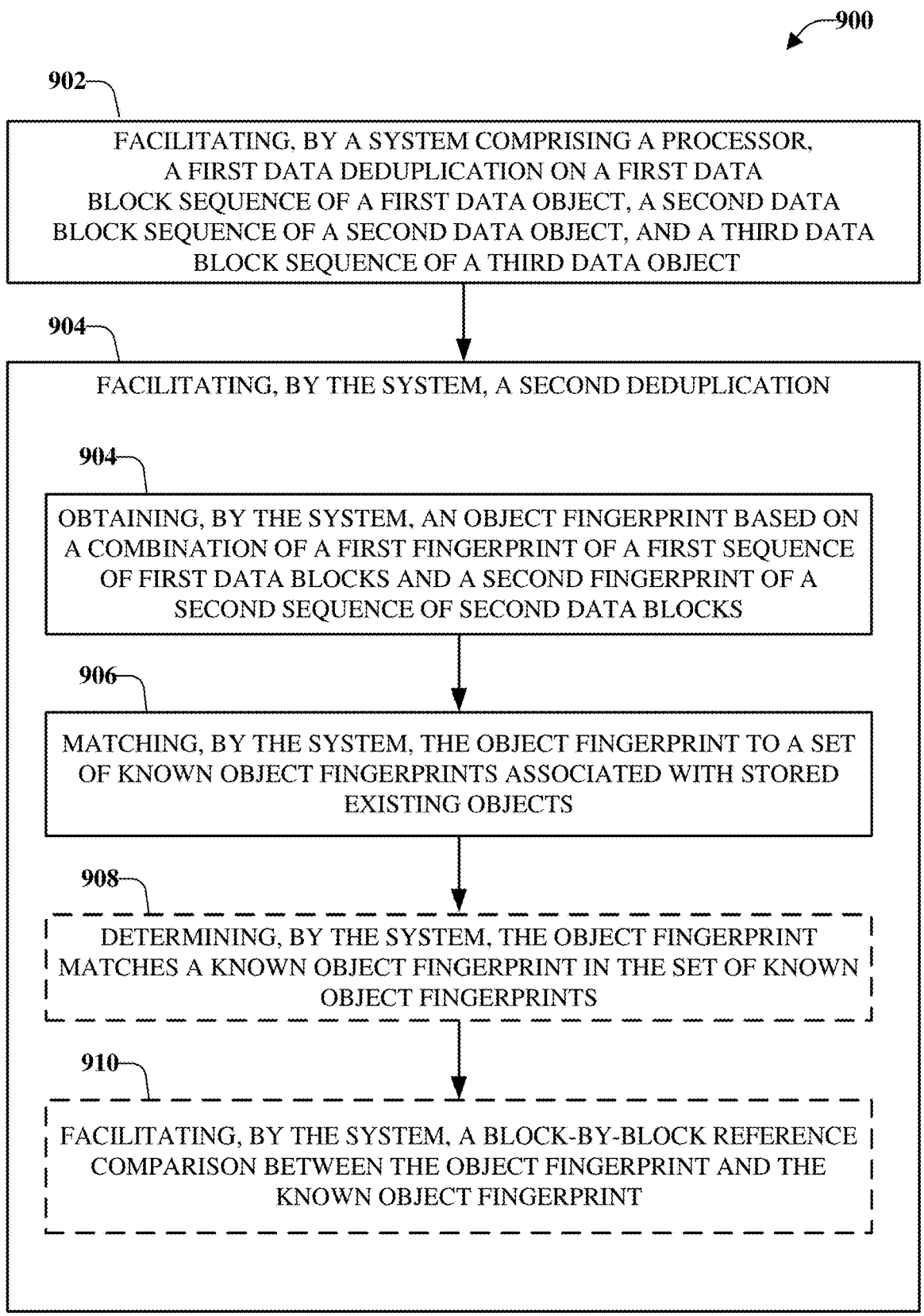
FIG. 9 illustrates a flow diagram of an example, non-limiting, computer-implemented method that facilitates performing a first and second data deduplication in accordance with one or more embodiments described herein.

FIG. 9 illustrates a flow diagram of an example, non-limiting, computer-implemented method 900 that facilitates performing a first and second data deduplication in accordance with one or more embodiments described herein. Repetitive description of like elements employed in other embodiments described herein is omitted for sake of brevity.

At 902 of the computer-implemented method 900, a system comprising a processor can facilitate a first data deduplication on a first data block sequence of a first data object, a second data block sequence of a second data object, and a third data block sequence of a third data object (e.g., via the data deduplication engine component 604). Further, at 904 of the computer-implemented method 900, the system can facilitate a second data deduplication (e.g., via the data deduplication engine component 604).

Performing the second data deduplication can comprise, obtaining, by the system, an object fingerprint based on a combination of a first fingerprint of a first sequence of first data blocks and a second fingerprint of a second sequence of second data blocks at 906 of the computer-implemented method 900 (e.g., via the combiner component 610). Further, the system can match the object fingerprint to a set of known object fingerprints associated with stored existing objects, at 908 of the computer-implemented method 900 (e.g., via the comparison component 606).

In an additional implementation, the computer-implemented method 900 can comprise, determining, by the system, the object fingerprint matches a known object fingerprint in the set of known object fingerprints, at 910 (e.g., via the comparison component 606). Further to this additional implementation, at 912 of the computer-implemented method 900, the system can facilitate a block-by-block reference comparison between the object fingerprint and the known object fingerprints (e.g., via the comparison component 606).

Figure 10:
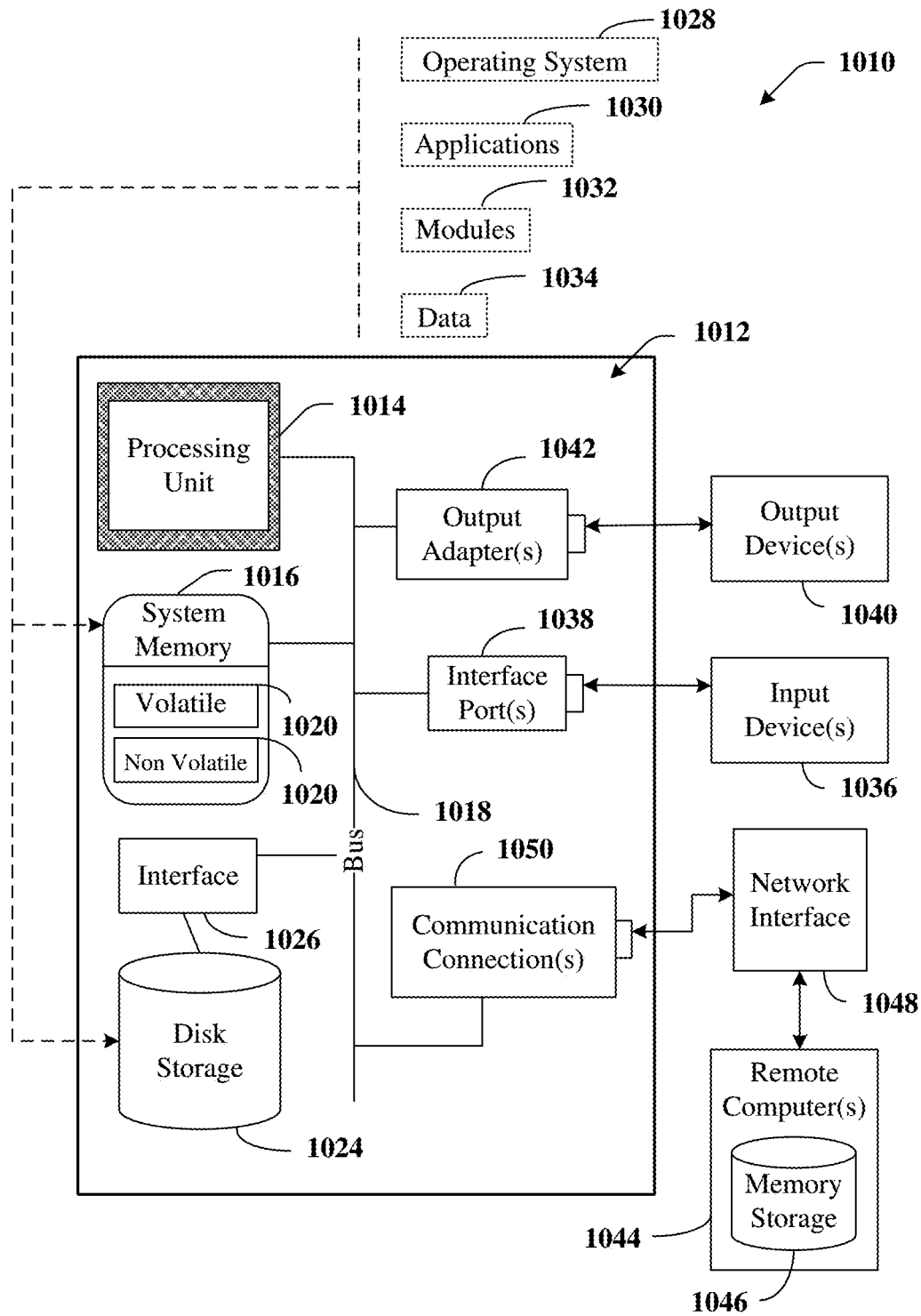
FIG. 10 illustrates an example, non-limiting, computing environment in which one or more embodiments described herein can be facilitated.

In order to provide a context for the various aspects of the disclosed subject matter, FIG. 10 as well as the following discussion are intended to provide a brief, general description of a suitable environment in which the various aspects of the disclosed subject matter can be implemented.

With reference to FIG. 10, an example environment 1010 for implementing various aspects of the aforementioned subject matter comprises a computer 1012. The computer 1012 comprises a processing unit 1014, a system memory 1016, and a system bus 1018. The system bus 1018 couples system components including, but not limited to, the system memory 1016 to the processing unit 1014. The processing unit 1014 can be any of various available processors. Multi-core microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1016 comprises volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can comprise read only memory (ROM), programmable ROM (PROM), electrically programmable ROM (EPROM), electrically erasable PROM (EEPROM), or flash memory. Volatile memory 1020 comprises random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SL-DRAM), and direct Rambus RAM (DRRAM).

Computer 1012 also comprises removable/non-removable, volatile/non-volatile computer storage media. FIG. 10 illustrates, for example a disk storage 1024. Disk storage 1024 comprises, but is not limited to, devices like a magnetic disk drive, floppy disk drive, tape drive, Jaz drive, Zip drive, LS-100 drive, flash memory card, or memory stick. In addition, disk storage 1024 can comprise storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1024 to the system bus 1018, a removable or non-removable interface is typically used such as interface 1026.

It is to be appreciated that FIG. 10 describes software that acts as an intermediary between users and the basic computer resources described in suitable operating environment 1010. Such software comprises an operating system 1028. Operating system 1028, which can be stored on disk storage 1024, acts to control and allocate resources of the computer 1012. System applications 1030 take advantage of the management of resources by operating system 1028 through program modules 1032 and program data 1034 stored either in system memory 1016 or on disk storage 1024. It is to be appreciated that one or more embodiments of the subject disclosure can be implemented with various operating systems or combinations of operating systems.

A user enters commands or information into the computer 1012 through input device(s) 1036. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 comprise, for example, a serial port, a parallel port, a game port, and a universal serial bus (USB). Output device(s) 1040 use some of the same type of ports as input device(s) 1036. Thus, for example, a USB port can be used to provide input to computer 1012, and to output information from computer 1012 to an output device 1040. Output adapters 1042 are provided to illustrate that there are some output devices 1040 like monitors, speakers, and printers, among other output devices 1040, which require special adapters. The output adapters 1042 comprise, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically comprises many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses communication networks such as local-area networks (LAN) and wide-area networks (WAN). LAN technologies comprise Fiber Distributed Data Interface (FDDI), Copper Distributed Data Interface (CDDI), Ethernet/IEEE 802.3, Token Ring/IEEE 802.5 and the like. WAN technologies comprise, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the system bus 1018. While communication connection 1050 is shown for illustrative clarity inside computer 1012, it can also be external to computer 1012. The hardware/software necessary for connection to the network interface 1048 comprises, for exemplary purposes only, internal and external technologies such as, modems including regular telephone grade modems, cable modems and DSL modems, ISDN adapters, and Ethernet cards.

Figure 11:
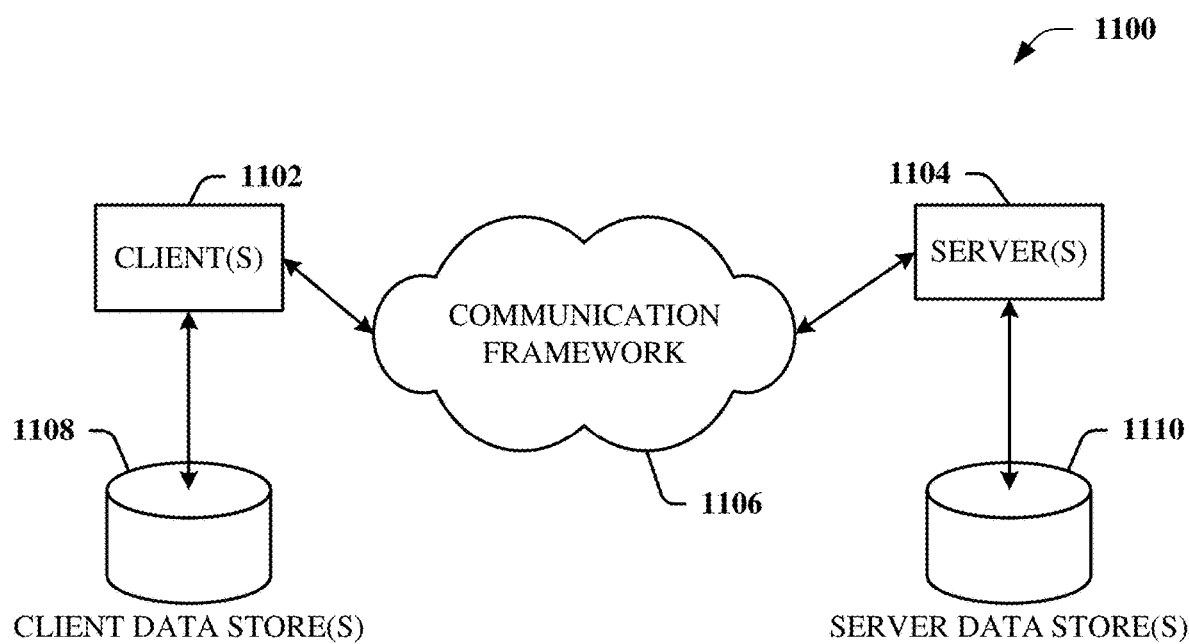
FIG. 11 illustrates an example, non-limiting, networking environment in which one or more embodiments described herein can be facilitated.

FIG. 11 is a schematic block diagram of a sample computing environment 1100 with which the disclosed subject matter can interact. The sample computing environment 1100 includes one or more client(s) 1102. The client(s) 1102 can be hardware and/or software (e.g., threads, processes, computing devices). The sample computing environment 1100 also includes one or more server(s) 1104. The server(s) 1104 can also be hardware and/or software (e.g., threads, processes, computing devices). The servers 1104 can house threads to perform transformations by employing one or more embodiments as described herein, for example. One possible communication between a client 1102 and servers 1104 can be in the form of a data packet adapted to be transmitted between two or more computer processes. The sample computing environment 1100 includes a communication framework 1106 that can be employed to facilitate communications between the client(s) 1102 and the server(s) 1104. The client(s) 1102 are operably connected to one or more client data store(s) 1108 that can be employed to store information local to the client(s) 1102. Similarly, the server(s) 1104 are operably connected to one or more server data store(s) 1110 that can be employed to store information local to the servers 1104.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics can be combined in any suitable manner in one or more embodiments.

As used in this disclosure, in some embodiments, the terms "component," "system," "interface," "manager," and the like are intended to refer to, or comprise, a computer-related entity or an entity related to an operational apparatus with one or more specific functionalities, wherein the entity can be either hardware, a combination of hardware and software, software, or software in execution, and/or firmware. As an example, a component can be, but is not limited to being, a process running on a processor, a processor, an object, an executable, a thread of execution, computer-executable instructions, a program, and/or a computer. By way of illustration and not limitation, both an application running on a server and the server can be a component One or more components can reside within a process and/or thread of execution and a component can be localized on one computer and/or distributed between two or more computers. In addition, these components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software application or firmware application executed by one or more processors, wherein the processor can be internal or external to the apparatus and can execute at least a part of the software or firmware application. As yet another example, a component can be an apparatus that provides specific functionality through electronic components without mechanical parts, the electronic components can comprise a processor therein to execute software or firmware that confer(s) at least in part the functionality of the electronic components. In an aspect, a component can emulate an electronic component via a virtual machine, e.g., within a cloud computing system. While various components have been illustrated as separate components, it will be appreciated that multiple components can be implemented as a single component, or a single component can be implemented as multiple components, without departing from example embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the various embodiments can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, machine-readable media, computer-readable (or machine-readable) storage/communication media. For example, computer-readable storage media can comprise, but are not limited to, radon access memory (RAM), read only memory (ROM), electrically erasable programmable read only memory (EEPROM), flash memory or other memory technology, solid state drive (SSD) or other solid-state storage technology, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media. Of course, those skilled in the art will recognize many modifications can be made to this configuration without departing from the scope or spirit of the various embodiments The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   facilitating, by a system comprising a processor, a first deduplication of a set of data objects at a data block level of a storage device, wherein the set of data objects comprises a first data object, a second data object, and a third data object, wherein the facilitating the first deduplication comprises:
      facilitating a first comparison of a first data block sequence of the first data object, a second data block sequence of the second data object, and a third data block sequence of the third data object;
   facilitating, by the system, a second deduplication of the set of data objects at an object level of the storage device; wherein the facilitating the second deduplication comprises:
      facilitating the second deduplication on the first data block sequence of the first data object and the third data block sequence of the third data object based on a result of the first comparison indicating the first data block sequence and the third data block sequence are different data block sequences;
      combining a first fingerprint for the first data block sequence of the first data object and a second fingerprint for the third data block sequence of the third data object, resulting in a combined fingerprint; and
      facilitating a block-by-block comparison between the combined fingerprint and a set of known fingerprints associated with stored data blocks;
   performing deduplication on first blocks of the first data object and second blocks of the third data object based on a first determination that the first blocks and the second blocks match a stored data block of stored data blocks; and
   storing third blocks of the first data object and fourth blocks of the third data object based on a second determination that the third blocks and the fourth blocks do not match the stored data blocks.

2. The method of claim 1, wherein the result is a first result, and wherein the facilitating the first deduplication comprises:
   facilitating a deduplication that replaces the second data block sequence of the second data object with a reference to the first data block sequence of the first data object based on a second result of the comparison indicating the first data block sequence and the second data block sequence are identical data block sequences.

3. The method of claim 1, wherein the facilitating the second deduplication further comprises:
   obtaining, by the system, an object fingerprint based on a combination of the first fingerprint and a third fingerprint of the second data block sequence; and matching, by the system, the object fingerprint to a set of known object fingerprints associated with stored existing objects.

4. The method of claim 3, further comprising:
determining, by the system, the object fingerprint matches a known object fingerprint in the set of known object fingerprints; and
facilitating, by the system, a block-by-block reference comparison between the object fingerprint and the known object fingerprint.

5. The method of claim 1, wherein the storage device is a storage device of an elastic cloud storage system.

6. A system, comprising:
a processor; and
a memory that stores executable instructions that, when executed by the processor, facilitate performance of operations, comprising:
performing a first deduplication on a group of data objects at a data block level of a storage device, wherein the group of data objects comprises a first data object, a second data object, and a third data object;
comparing a first data block sequence of the first data object, a second data block sequence of the second data object, and a third data block sequence of the third data object;
performing a second deduplication of the group of data objects at an object level of the storage device; and
performing the second deduplication on the first data block sequence of the first data object and the third data block sequence of the third data object based on a result of the comparing indicating the first data block sequence and the third data block sequence are different data block sequences;
combining a first hash value for the first data block sequence of the first data object and a second hash value for the third data block sequence of the third data object;
comparing a first group of blocks of the first data object, a second group of blocks of the second data object, and a third group of blocks of the third data object;
replacing first blocks of the third group of blocks of the third data object with a reference to second blocks of the first group of blocks of the first data object based on the first blocks being determined to match the second blocks; and
storing third blocks of the third group of blocks and fourth blocks of the first group of blocks based on the third blocks and the fourth blocks being determined to be non-matching blocks.

7. The system of claim 6, wherein the reference is a first reference, and wherein the operations further comprise:
replacing the second data block sequence of the second data object with a second reference to the first data block sequence of the first data object based on the first data block sequence and the second data block sequence being determined to be identical data block sequences.

8. The system of claim 6, wherein the operations further comprise:
prior to the performing the first deduplication, determining respective hash values for data objects in the group of data objects.

9. The system of claim 6, wherein the reference is a first reference, wherein the first data object is stored in the storage device and a fourth data object is scheduled to be added to the storage device; and wherein the operations further comprise:
comparing the first hash value of the first data object against a third hash value of the fourth data object; and
performing one of:
replacing the fourth data object with a second reference to the first data object based on a first determination that the first hash value and the third hash value are identical hash values, or
storing the fourth data object in the storage device based on a second determination that the first hash value and the third hash value are non-identical hash values.

10. The system of claim 6, wherein the performing the first deduplication comprises facilitating a single fingerprint calculation for the group of data objects, and wherein the performing the second deduplication comprises facilitating a single byte-by-byte comparison between data objects in the group of data objects that have been determined not to match during the single fingerprint calculation.

11. The system of claim 6, wherein the storage device is a storage device of an elastic cloud storage system.

12. A non-transitory computer-readable medium comprising instructions that, in response to execution, cause a system comprising a processor to perform operations, comprising:
facilitating a first deduplication of a set of data objects at a data block level of a storage device, wherein the set of data objects comprises a first data object, a second data object, and a third data object, and wherein the facilitating the first deduplication comprises:
facilitating a first comparison of a first data block sequence of the first data object, a second data block sequence of the second data object, and a third data block sequence of the third data object;
facilitating a second deduplication of the set of data objects at an object level of the storage device comprising:
facilitating the second deduplication on the first data block sequence of the first data object and the third data block sequence of the third data object based on a result of the first comparison indicating the first data block sequence and the third data block sequence are different data block sequences;
combining a first fingerprint for the first data block sequence of the first data object and a second fingerprint for the third data block sequence of the third data object, resulting in a combined fingerprint; and
facilitating a block-by-block comparison between the combined fingerprint and a set of known fingerprints associated with stored data blocks;
performing deduplication on first blocks of the first data object and second blocks of the third data object based on a first determination that the first blocks and the second blocks match a stored data block of stored data blocks; and
storing third blocks of the first data object and fourth blocks of the third data object based on a second determination that the third blocks and the fourth blocks do not match the stored data blocks.

13. The non-transitory computer-readable medium of claim 12, wherein the operations further comprise:
comparing respective data block sequences of the set of data objects; and
performing deduplication that replaces the first data object of the set of data objects with a reference to the second data object of the set of data objects based on the first data object and the second data object being determined to be duplicate data objects.

14. The non-transitory computer-readable storage medium of claim 12, wherein the operations further comprise:

combining the first fingerprint calculated for the first data object of the set of data objects and a third fingerprint calculated for the second data object of the set of data objects to obtain the combined fingerprint;

comparing the combined fingerprint with known fingerprints; and replacing the combined fingerprint with a reference to a known fingerprint of the known fingerprints based on the combined fingerprint being determined to be a duplicate of the known fingerprint.

15. The non-transitory computer-readable medium of claim 12, wherein the facilitating the first deduplication comprises performing a single fingerprint calculation for the set of data objects.

16. The non-transitory computer-readable medium of claim 12, wherein the facilitating the second deduplication comprises performing a single byte-by-byte comparison of at least two data objects of the set of data objects that have been determined not to match during a single fingerprint calculation.

17. The system of claim 6, wherein the system is a two-level data deduplication engine component.

18. The method of claim 1, wherein the facilitating the first deduplication comprises facilitating a single fingerprint calculation for the set of data objects.

19. The method of claim 1, wherein the facilitating the second deduplication comprises facilitating a single byte-by-byte comparison between data objects in the set of data objects that have been determined not to match during a single fingerprint calculation.

20. The method of claim 1, wherein the facilitating the first deduplication and the facilitating the second deduplication reduces storage overhead based on elimination of redundant copies of data.

\* \* \* \* \*